Oct. 7, 1924.
C. G. HOLT
MIXING VALVE
Filed Oct. 3, 1921
1,510,991
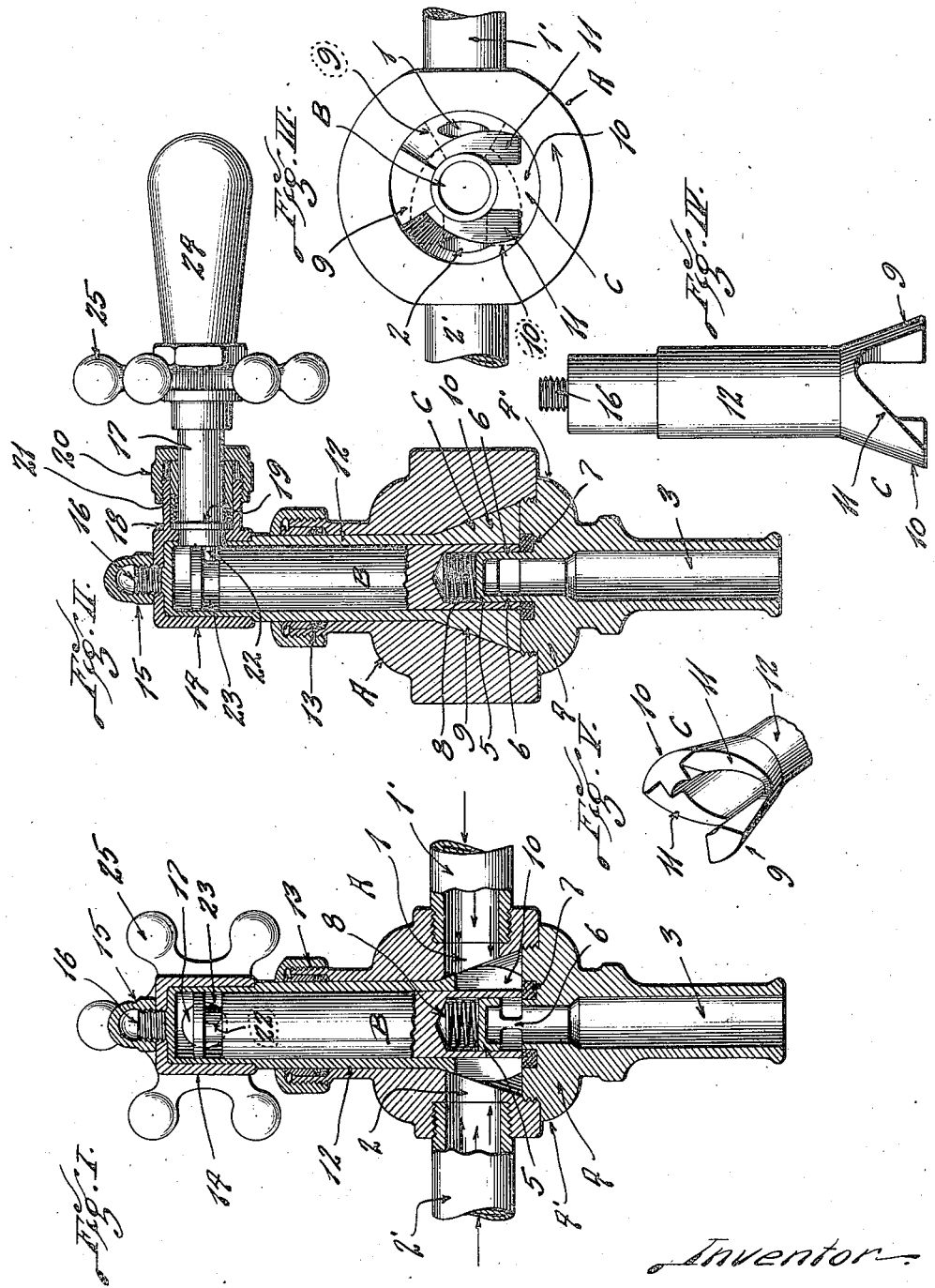
Inventor
Claude G. Holt
by Cook & McCauley Attys.

Patented Oct. 7, 1924.

1,510,991

UNITED STATES PATENT OFFICE.

CLAUDE G. HOLT, OF ST. JOHNS STATION, MISSOURI.

MIXING VALVE.

Application filed October 3, 1921. Serial No. 504,884.

*To all whom it may concern:*

Be it known that I, CLAUDE G. HOLT, a citizen of the United States, a resident of St. Johns Station, Overland, in the county of St. Louis and State of Missouri, have invented certain new and useful Improvements in Mixing Valves, of which the following is a full, clear, and exact description, reference being had to the accompanying drawings, forming a part of this specification.

This invention relates to improvements in mixing valves, and more particularly to a valve device whereby hot and cold fluids, such as hot and cold water, are commingled with each other. In using a valve device of this kind it is desirable to determine the temperature of the water issuing from the device and to regulate the flow without changing the temperature. Therefore, the device herein shown includes temperature-regulating valve elements adjustable to vary the temperature of the stream of water, and an outlet valve adjustable to control the discharge of water without materially changing the temperature. After the temperature-regulating valve elements have been adjusted to obtain the desired temperature, the outlet valve can be closed and opened and otherwise adjusted to vary the flow without materially changing the temperature of the variable stream passing from the device. An object of the invention is to produce an extremely simple operating means for a valve device of this kind.

More specifically stated, the preferred form of the invention comprises an operating handle movable in one direction to regulate the temperature and movable in another direction to regulate the discharge of the water. The single operating handle can be very easily manipulated to determine both the temperature and the rate of flow, and after the temperature has been determined the same operating handle can be repeatedly adjusted to vary the flow without changing the temperature of the water.

To illustrate this feature I will hereafter describe a temperature-regulating valve adapted to open and close the inlets for hot and cold water so as to regulate the temperature of the water passing from the device, an outlet valve adjustable independently of said temperature-regulating valve so as to vary the stream of water passing from the device, and an operating handle common to both valves. This single operating handle is movable in opposite directions about an axis to regulate one of the valves, and it can be turned in opposite directions about another axis to adjust the other valve. The different axes can be conveniently located at a right angle to each other so that the handle can be turned about the axis of one valve to turn said valve, and the handle can be turned on its own axis to adjust the other valve.

A further object is to produce an inexpensive mixing valve consisting of a few strong and simple elements associated with each other to effectively perform their several functions. Another object is to prevent leakage from the hot water inlet to the cold water inlet.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a vertical section of a valve device embodying the features of this invention.

Fig. II is a vertical section taken approximately through the center of Fig. I.

Fig. III is a bottom view of the valve device with the discharge nozzle removed to show the valves in the valve housing.

Fig. IV is a side elevation of the temperature-regulating valve.

Fig. V is a perspective view showing the segmental valve elements of the temperature-regulating valve.

A designates a valve housing having an inlet port 1 for the admission of cold water and an inlet port 2 for hot water, or steam. The hot and cold fluids passing through these ports are commingled with each other and discharged through a nozzle 3. A cold water delivery pipe 1' is screwed into the cold water inlet 1, and a hot water delivery pipe 2' is screwed into the hot water inlet 2. The discharge nozzle 3 has an enlarged upper end 4 in the form of a flange screwed into the body of the valve housing, said flange having a marginal extension 4' engaging the bottom face of said body.

A spring seat 5 is located within the valve housing and integrally connected to the discharge nozzle 3 through the medium of vertical ribs 6, shown in Figs. I and II. These ribs are separated from each other to provide outlet ports through which the hot and cold fluids pass to the discharge nozzle.

B designates an outlet valve in the form of a cylindrical rod having a hollow lower end surrounding the spring seat 5 and adapted to contact with a valve seat 7 to prevent the escape of fluid to the discharge nozzle 3. The valve seat 7 may be a fiber ring flush with the top face of flange 4, and the discharge valve B can be adjusted vertically to move its lower end toward and away from the seat 7, thereby regulating the discharge of fluid from the valve housing.

To prevent vibration, or chattering, of the valve device, a compression spring 8 is interposed between the spring seat 5 and the top wall of the cavity in the outlet valve B. This spring tends to open the valve B, but said valve is controlled by a manually operated handle, as will be hereafter described.

The temperature-regulating means comprises a tapering valve C, substantially in the form of a cone, engaging a tapering seat in the valve housing and adapted to be rotated to open and close the inlet ports 1 and 2. This valve has segmental valve elements 9 and 10 adapted to close the inlet ports. The tapering valve C is open at the center to receive the lower end of the outlet valve B, and the segmental valve elements 9 and 10 are separated from each other to provide for the flow of fluids from the inlets 1 and 2 to the discharge nozzle 3. The segmental valve element 10 is wider than the valve element 9, and it has inclined edges 11 (Figs. III, IV and V) extending from its lower end to the upper end of the valve element 9.

The dotted lines in Fig. III show the temperature-regulating valve in its closed position, the cold water inlet 1 being closed by the segmental valve element 9, and the hot water inlet 2 being closed by the wider valve element 10. Assuming that this valve is closed, as shown by dotted lines in Fig. III, it can be turned in the direction of the arrow to the position shown by full lines. At the beginning of this movement, the cold water inlet 1 will be gradually opened while the hot water inlet is closed by the relatively large segmental valve element 10, and as the motion continues, the cold water inlet 1 will be entirely opened. Thereafter, the large valve element 10, moving as indicated by the arrow in Fig. III, will gradually open the hot water inlet 2 and at the same time gradually close the cold water inlet 1, and if the motion is continued, the valve element 10 will finally close the cold water inlet 1 and completely open the hot water inlet 2.

It will therefore be understood that the temperature-regulating valve can be adjusted to deliver either cold water, hot water, or any desired mixture of the cold and hot water, so the valve can be adjusted for any desired temperature between the two extremes, and after the desired adjustment has been obtained, the outlet valve B can be regulated to vary the flow without materially changing the temperature.

While the temperature-regulating valve is being adjusted the outlet valve B should occupy an open position, so that the temperature of the water can be determined by testing the stream issuing from the device. In determining the temperature, it is desirable to begin with a flow of cold water alone, and to gradually admit the hot water to the cold stream, thereby avoiding a sudden or unexpected delivery of very hot water. This result can be obtained by opening the outlet valve B, and turning the symmetrical valve C in either direction from the position shown by dotted lines in Fig. III.

The temperature-regulating valve has a tubular operating stem 12 surrounding the outlet valve B and extending through a stuffing box 13 at the upper end of the valve housing. A cap 14 is mounted on the top of the tubular stem 12 and secured thereto by means of a nut 15 applied to a screw 16 formed integral with the stem 12 and extending through the top of the cap.

An operating rod 17 (Figs. I and II) extends through a stuffing box 18 at one side of the cap 14, and this rod projects through said side of the cap and into the tubular stem 12, as shown by Fig. II. A collar 19, formed on the rod 17, frictionally engages the inner wall of stuffing box 18, and the rod is secured by means of the stuffing box nut 20 and gland 21 whereby the packing is forced onto the collar 19 to retain the same in engagement with the inner wall of the stuffing box. This prevents undue longitudinal displacement of the operating rod 17 and retains its inner end in the tubular valve stem 12.

A crank pin 22, projecting from the inner end of rod 17, extends into an annular groove 23 in the periphery of outlet valve B, and since this crank pin is eccentric to the axis of rod 17 it will be apparent that the rod can be turned about its own axis with the result of raising or lowering the outlet valve. The outlet valve B is thus adjusted by merely turning the rod in the stuffing box 18, and the friction at the collar 19 tends to retain said rod in the position to which it is adjusted.

The axis of rod 17 lies at a right angle to the axis of the tapering valve C, and said rod is extended into the tubular valve stem 12, as shown at the upper portion of Figs. I and II, so if the operating rod 17 is turned about the axis of the tapering valve C a corresponding movement will be imparted to said valve.

To facilitate the operation of rod 17, it may be provided with an elongated hand-receiving member 24 adapted to be grasped to swing the rod about the vertical axis of the tapering valve C, and a wheel 25 adapted to be grasped to turn the rod about its own axis. However, it is not absolutely necessary to employ these two hand-receiving members 24 and 25. They are rigidly fixed to the rod 17, and they enable the operator to obtain a firm hold on the operating handle. The members 24 and 25 are thus combined with the operating rod 17 to provide a single operating handle rotatable in opposite directions about its own axis to adjust the outlet valve B, and rotatable about the axis of the tapering valve C to regulate the temperature of the water. This single operating handle is adapted to actuate either valve independently of the other and it can be very conveniently operated by one hand to regulate the temperature and the flow of the water.

It is possible for the user of the valve device to close the outlet valve B while both inlet ports are open, and the valve device may be left in this condition for a long period of time. Therefore, it is desirable to prevent leakage of hot water from the inlet 2 to the cold water inlet 1 when the outlet valve is closed. The hot water is usually under a higher pressure than the cold water, and it is not desirable to allow the hot water to accumulate in the cold water line. With the foregoing in view, the outlet valve B is located in the open center of the tapering valve C and closely fitted to the segmental valve elements 9 and 10, so as to form a partition across the interior of the valve housing (Fig. III), thereby preventing flow from the hot water inlet to the cold water inlet when the valves are positioned as shown by full lines in Figs. I and III.

It is desirable to retain the tapering valve C in firm engagement with its tapering seat, and also to maintain this seat in a clean condition. For these reasons, the valve operating means is designed to force the tapering valve into frictional engagement with its seat. When the operating rod 17 is turned on its axis to close the outlet valve B, the crank pin 22 engages the bottom of the annular groove 23 in the outlet valve, so as to force said valve downwardly and into firm engagement with its seat 7. Since the operating rod is rotatably mounted in the tubular valve stem 12 extending from the small end of the tapering valve C, it will be apparent that the motion just referred to will impart an upward thrust to the tapering valve when a downward thrust is imparted to the outlet valve B. As a consequence, when the outlet valve is firmly closed, the tapering valve will be firmly forced onto its tapering seat. Furthermore, when the outlet valve B occupies its open position, the spring 8 will tend to retain the tapering valve in engagement with its seat.

I claim:

1. A valve device comprising a valve housing having two inlets for the admission of hot and cold fluids and a discharge passageway adapted to communicate with said inlets, temperature-regulating valve elements adapted to control communication between said inlets and said discharge passageway, a vertically movable outlet valve adapted to regulate the flow of fluid through said discharge passageway, and an operating handle common to said outlet valve and temperature-regulating valve elements, said operating handle being provided with a rotary operating member movable in opposite directions to adjust said temperature-regulating valve elements and also with a rotary operating member movable in opposite directions to adjust said vertically movable outlet valve.

2. A valve device comprising a valve housing having a valve seat provided with an inlet for hot fluid and an inlet for cold fluid, a temperature-regulating valve rotatably fitted to said seat to control the admission of fluids through said inlets, said valve housing also having a discharge passageway for the mixed fluids passing from said inlets, an outlet valve controlling the flow through said discharge passageway, and operating means for said outlet valve adapted to force said temperature-regulating valve onto said valve seat.

3. A valve device comprising a valve housing having a valve seat provided with an inlet for hot fluid and an inlet for cold fluid, a temperature-regulating valve rotatably fitted to said seat to control the admission of fluids through said inlets, said valve housing also having a discharge passageway for the mixed fluids passing from said inlets, an outlet valve controlling the flow through said discharge passageway, said temperature-regulating valve having a tubular stem in which said outlet valve is slidably mounted, and operating means whereby said tubular stem and outlet valve are forced in opposite directions parallel with the axis of said temperature-regulating valve, so as to force both valves onto their seats.

4. A valve device comprising a valve housing having a valve seat provided with an inlet for hot fluid and an inlet for cold fluid, a temperature-regulating valve rotatably fitted to said seat to control the admission of fluids through said inlets, said valve housing also having a discharge passageway for the mixed fluids passing from said inlets, an outlet valve controlling the flow through said discharge passageway, said temperature-regulating valve having a tubular stem in which said outlet valve is slidably mounted, and operating means whereby said tubular stem and outlet valve are forced in opposite directions parallel with the axis of said temperature-regulating valve, so as to force both valves onto their seats, said operating means including an operating member rotatably mounted in said tubular stem and a crank element extending from said operating member to actuate said outlet valve.

5. A valve device comprising a housing having a tapering valve seat provided with an inlet for hot fluid and an inlet for cold fluid, a tapering mixing valve rotatably fitted to said tapering seat to control the admission of fluids through said inlets, an operating stem extending from the relatively small end of said tapering valve, said valve housing also having a discharge passageway for the mixed fluids passing from said inlets, an outlet valve adapted to open and close said discharge passageway, said outlet valve being slidably mounted in said tapering valve and its operating stem, and an operating member rotatably mounted in said stem and provided with an eccentric extension whereby said outlet valve is actuated.

6. A valve device comprising a housing having a tapering valve seat provided with an inlet for hot fluid and an inlet for cold fluid, a tapering mixing valve rotatably fitted to said tapering seat to control the admission of fluids through said inlets, said valve housing also having a discharge passageway, an outlet valve controlling the flow through said discharge passageway, means tending to open said outlet valve, and manually operated means for closing said outlet valve, said manually operated means being capable of retaining said outlet valve in positions intermediate of the closed and the entirely open positions.

7. A valve device comprising a housing having a tapering valve seat provided with an inlet for hot fluid and an inlet for cold fluid, a tapering mixing valve rotatably fitted to said tapering seat to control the admission of fluids through said inlets, said valve housing also having a discharge passageway, an outlet valve controlling the flow through said discharge passageway, a spring tending to open said outlet valve, and manually operated means for closing said outlet valve, said manually operated means being capable of retaining said outlet valve in positions intermediate of the closed and the entirely open position.

8. A valve device comprising a housing having a tapering valve seat provided with an inlet for hot fluid and an inlet for cold fluid, a tapering mixing valve rotatably fitted to said tapering seat to control the admission of fluids through said inlets, said valve housing also having a discharge passageway, an outlet valve controlling the flow through said discharge passageway, a spring tending to open said outlet valve, and manually operated means including a rotatably mounted operating member and a crank element extending from said operating member and engaging said outlet valve for closing said outlet valve, said manually operated means being capable of retaining said outlet valve in positions intermediate of the closed and the entirely open positions.

In testimony that I claim the foregoing I hereunto affix my signature.

CLAUDE G. HOLT.